US012669621B2

(12) United States Patent
Yanagihara et al.

(10) Patent No.: US 12,669,621 B2
(45) Date of Patent: Jun. 30, 2026

(54) RADIATION DETECTOR, RADIATION MEASURING APPARATUS, AND METHOD FOR SETTING RADIATION DETECTOR

(71) Applicant: Rigaku Corporation, Tokyo (JP)

(72) Inventors: Kunitoshi Yanagihara, Akishima (JP);
Tomonao Inoue, Akishima (JP);
Yasutaka Sakuma, Akishima (JP);
Yasukazu Nakaye, Akishima (JP);
Takuto Sakumura, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 127 days.

(21) Appl. No.: 18/581,436

(22) Filed: Feb. 20, 2024

(65) Prior Publication Data

US 2024/0280714 A1 Aug. 22, 2024

(30) Foreign Application Priority Data

Feb. 21, 2023 (JP) .................................. 2023-024871

(51) Int. Cl.
*G01T 1/24* (2006.01)
*G01N 23/20008* (2018.01)
(52) U.S. Cl.
CPC ......... *G01T 1/24* (2013.01); *G01N 23/20008* (2013.01)
(58) Field of Classification Search
CPC .............................. G01T 1/24; G01N 23/20008
See application file for complete search history.

(56) References Cited

U.S. PATENT DOCUMENTS

| | | | | |
|---|---|---|---|---|
| 4,357,516 A | * | 11/1982 | Inoue ..................... | B23H 1/024 |
| | | | | 219/69.18 |
| 4,618,775 A | * | 10/1986 | Persyk ...................... | G01T 1/17 |
| | | | | 250/369 |
| 9,945,961 B2 | | 4/2018 | Sakumura et al. | |
| 2004/0245592 A1 | * | 12/2004 | Harmon ................ | H10F 30/225 |
| | | | | 257/E27.128 |

(Continued)

FOREIGN PATENT DOCUMENTS

| | | |
|---|---|---|
| GB | 1 526 060 A | 9/1978 |
| JP | H02-102483 A | 4/1990 |

(Continued)

OTHER PUBLICATIONS

Extended European Search Report issued Jul. 11, 2024 in corresponding European Patent Application No. 24158773.2, 15 pages.

(Continued)

*Primary Examiner* — Hugh Maupin
(74) *Attorney, Agent, or Firm* — XSENSUS LLP

(57) ABSTRACT

A radiation detector that suppress a double count which occurs by detecting a single pulse duplicately with a plurality of counters in counter switching, and can acquire highly accurate data, is configured to detect radiation in continuous exposure, comprises a sensor for generating a pulse when a particle of radiation is detected, a plurality of counters provided for counting the pulses, a setting holding circuit for holding a setting of an off-time for turning off any of the plurality of counters, and a control circuit for switching the counter performing counting the pulses after a lapse of the off-time with respect to a trigger signal.

7 Claims, 11 Drawing Sheets

(56)　　　　　References Cited

U.S. PATENT DOCUMENTS

| 2012/0087472 | A1 | 4/2012 | Nyholm | |
| 2014/0191136 | A1* | 7/2014 | Loeliger | G01T 1/171 |
| | | | | 250/394 |
| 2015/0212213 | A1 | 7/2015 | Sakumura et al. | |
| 2016/0195623 | A1* | 7/2016 | Wang | G01T 1/171 |
| | | | | 250/370.09 |
| 2017/0160129 | A1* | 6/2017 | Viswanath | G01J 1/46 |
| 2017/0371044 | A1* | 12/2017 | Sakumura | G01T 1/171 |
| 2018/0284035 | A1 | 10/2018 | Steadman Booker et al. | |
| 2022/0264047 | A1 | 8/2022 | Antolovic et al. | |
| 2023/0288335 | A1* | 9/2023 | Niikura | G01N 21/6408 |
| 2024/0280714 | A1* | 8/2024 | Yanagihara | G01T 1/17 |
| 2025/0020816 | A1* | 1/2025 | Baturin | H01J 43/18 |

FOREIGN PATENT DOCUMENTS

| JP | 2014527162 | A | 10/2014 |
| JP | 2014230584 | A | 12/2014 |
| JP | 2015-096841 | A | 5/2015 |

OTHER PUBLICATIONS

Moller et al., "Implications of disturbed photon-counting statistics of Eiger detectors for X-ray speckle visibility experiments" Journal of Synchrotron Radiation, vol. 26, 2019, pp. 1-7.

Japanese Office Action issued Nov. 11, 2025 in corresponding Japanese Patent Application No. 2023-024871, 6 pages.

* cited by examiner $$N \times I_1 = \sum_{k=1}^{N} I_k$$

$$I_1 \ I_2 \ I_3 \ I_4 \ I_5 \ I_6 \ \cdots \ I_N$$

N frames

300

320

310

S0

330

100

400

410

S0

425

420

440

CONTROL
SECTION

100

RADIATION DETECTOR, RADIATION MEASURING APPARATUS, AND METHOD FOR SETTING RADIATION DETECTOR

CROSS-REFERENCE TO RELATED APPLICATION

This application claims priority from Japanese Patent Application No. 2023-024871, filed on Feb. 21, 2023, the entire contents of Japanese Patent Application No. 2023-024871 are incorporated herein by reference.

BACKGROUND

Field

The present disclosure relates to a radiation detector, a radiation measuring apparatus, and a method for setting a radiation detector that enables detecting radiation in continuous exposure.

Description of the Related Art

Conventionally, a radiation detector that enables continuous exposure by switching a plurality of counters is known (for example, refer to Patent Document 1). The radiation detector described in Patent Document 1 eliminates the dead time caused by the reading of the detected data by switching the counter when the trigger signal is received, thereby realizing continuous exposure.

However, when the measurement is performed in the continuous exposure of the zero dead mode, a single pulse has a constant width in a time exceeding the threshold (time constant), and when the counter is switched in that time, one photon that has entered the radiation detector is counted by two (for example, see Non-Patent Document 1). This double-counting phenomenon causes errors in counting more than the actual number of incident X-ray photons.

Non-Patent Document 1 reports a phenomenon in which the number of photons detected during continuous exposure deviates from an ideal curve indicating a detected photon with respect to an incident photon, and in particular, an error due to double count becomes noticeable when the exposure time is shortened.

Patent Document

Patent Document 1: JP-A-2015-096841

Non-Patent Document

Non-patent Document 1: Johannes Moller, Mario Reiser et al., "Implications of disturbed photon-counting statistics of Eiger detectors for X-ray speckle visibility experiments", Journal of synchrotron radiation, Accepted 4 May 2019

As described above, in the zero dead mode, a double count occurs at the timing of switching the counter by the digital circuit. FIG. 10 is a timing chart showing an example of occurrence of a double count. In FIG. 10, the wave height of the pulse entered into the counter circuit, on/off of each counter for counting the pulse and counting in the counter are shown.

As shown in FIG. 10, in the conventional radiation detector, when the pulse P01 enters only the counter C01, the counter C01 counts 1. However, when the pulse P02 enters the counter C01 and C02 at the timing of the counter switching, each of the counter C01 and C02 counts 1, and 2 are counted in total.

SUMMARY

The present disclosure has been made in view of such circumstances, and an object thereof is to provide a radiation detector, a radiation measuring apparatus, and a method of setting a radiation detector capable of suppressing a double count of overlapping detection of a single pulse by a plurality of counters at the time of switching the counter and acquiring highly accurate data.

(1) In an exemplary embodiment, the radiation detector of the present disclosure is a radiation detector detecting radiation in continuous exposure, comprising a sensor for generating a pulse when a particle of radiation is detected, a plurality of counters provided for counting the pulses, a setting holding circuit for holding a setting of an off-time for turning off any of the plurality of counters, and a control circuit for switching the counter performing counting the pulses after a lapse of the off-time with respect to a trigger signal.

(2) Further, in the radiation detector according to (1), the off-time is a time constant.

(3) Further, the radiation detector of the present disclosure is a radiation detector capable of detecting radiation in continuous exposure, comprising a sensor for generating a pulse when a particle of radiation is detected, a plurality of counters provided for counting the pulses, and a control circuit for switching the counter performing counting the pulses with respect to a trigger signal, wherein the number of detected photons relative to the number of incident photons is plotted on a theoretical curve determined on the basis of the radiation source.

(4) Further, in the radiation detector according to any one of (1) to (3), the radiation detector is a one-dimensional or two-dimensional detector.

(5) Further, the radiation measuring apparatus of the present disclosure is a radiation measuring apparatus capable of measuring radiation in continuous exposure, comprising a radiation source for continuously irradiating radiation a sample holder for holding a sample, and the radiation detector according to any one of (1) to (4).

(6) Further, the method for setting a radiation detector of the present disclosure is a method of setting a radiation detector for detecting radiation in continuous exposure, comprising steps of receiving an input for setting an off-time for turning off any of a plurality of counters comprised in the radiation detector, and causing the radiation detector to hold the input setting.

DETAILED DESCRIPTION

Figure 1:
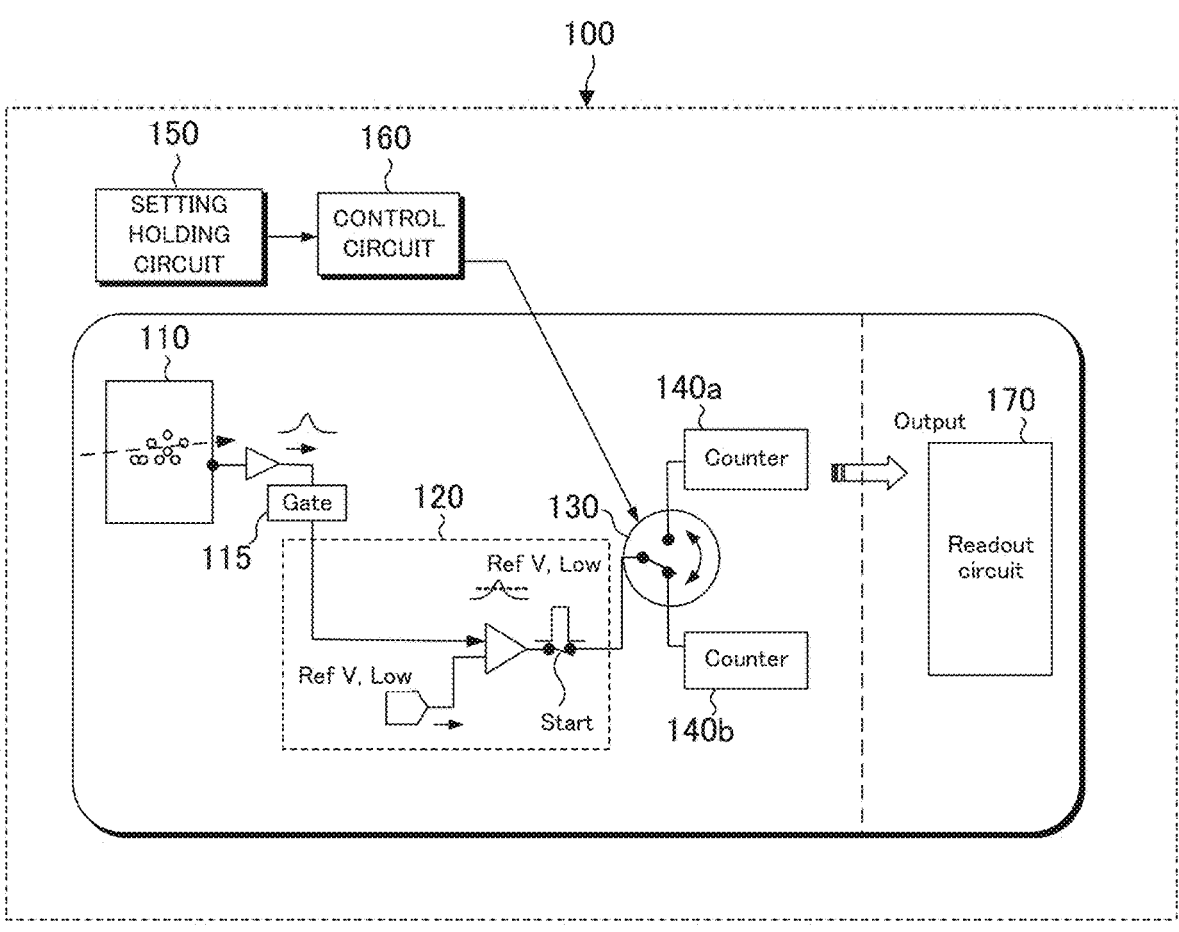
FIG. 1 is a schematic diagram showing a configuration of a radiation detector.

Next, exemplary embodiments of the present disclosure are described with reference to the drawings. To facilitate understanding of the description, the same reference numerals are assigned to the same components in the respective drawings, and duplicate descriptions are omitted.
[Configuration of Radiation Detector]

FIG. 1 is a schematic diagram showing a configuration of a radiation detector 100. The radiation detector 100 is a detector capable of switching a counter in synchronization with a trigger signal and detecting radiation in a continuous exposure. The radiation detector 100 is any one of 0-dimensional to 2-dimensional semiconductor detectors having a data buffer function. In an exemplary embodiment, the radiation detector 100 is a 1-dimensional or 2-dimensional detector. The radiation to be detected causes the function to be easily exerted when it is an X-ray, but is not limited to an X-ray, and may be an α-ray, a β-ray, a γ-ray, a neutron ray or the like.

The radiation detector 100 comprises a sensor 110, a gate 115, a detection circuit 120, a switching circuit 130, a first counter 140*a*, a second counter 140*b*, a setting holding circuit 150, a control circuit 160, and a readout circuit 170.

The sensor 110 generates a pulse when a particle of radiation is detected. The sensor 110 generates a pulse when a particle of radiation is detected. The sensor 110 can detect intensity of an X-ray flux incident on the receiving surface as plane information.

The gate 115 is opened and closed by an electronic shutter against the transmission of pulses. In the zero dead mode, the gate 115 is always open, and the exposure time is continuous. When the analog circuit is shut off, a return time is required until it is stabilized, and therefore, the opening and closing of the gate 115 is not used. It should be noted that the analog circuit is at a stage preceding the gate 115, and the digital circuit is at a stage following the gate 115.

The detection circuit 120 determines whether the pulse is higher than the reference value, and when the pulse is higher than the reference value, the detection circuit 120 transmits the pulse as a voltage signal to a counter during counting among the plurality of counters 140*a* and 140*b*. The switching circuit 130 switches a counter for counting a voltage signal when the counter switching signal from the control circuit 160 is received.

The counter 140*a* (first counter) and the counter 140*b* (second counter) each have equivalent functions and are provided so as to be able to count pulses. In the example shown in FIG. 1, two counters are provided, but three or more counters may be provided. By switching the counter, the exposure can be maintained without dead time.

The setting holding circuit 150 holds the setting of the off-time for turning off any of the plurality of counters. The off-time is a time for turning off any of a plurality of counters comprised in the radiation detector 100. In an exemplary embodiment, the off-time is a time constant. Thus, since the time in which the pulses exceed the threshold value does not overlap between the plurality of counters, it is possible to suppress counting loss while suppressing the double count. In this way, highly accurate data can be acquired at high speed. The threshold value is set in advance by the provider of the radiation detector 100.

The time constant is a time when the wave height of the pulse exceeds a threshold value. To be precise, the time constant is determined for each pixel. Here, the time constant includes not only a time constant for each pixel but also a global time constant (a statistical value such as an average value over the entire detection surface). In an exemplary embodiment, the time constant is not a numerical value at a single point determined by the above definition but has a width such as an error of the standard deviation or a width such that the double count for all the pixels falls within the statistical error centered on the statistical value.

The control circuit 160 switches a counter that counts pulses among the plurality of counters after a set off-time in synchronization with a signal received from an external device or a trigger signal generated internally. Specifically, in response to the trigger signal, it causes one of the counters, the one being counting at present, to stop counting and start the off-time, in which the setting is held by the setting holding circuit 150. Then, after the end of the off-time, it causes the other counter to start counting.

Thus, it is possible to detect the radiation without causing a dead time while maintaining the exposure state in which the radiation is continuously incident. Then, it is possible to suppress a double count in which a single pulse is detected in duplicate by the plurality of counters when the counter is switched. The signal received from the external device includes, for example, a signal for specifying a time or a position at the time of changing the position of the arm or the position of the sample. The sample means an analysis target, and the sample also includes a product.

The readout circuit 170 reads the count value from the counter that has finished counting immediately before between the generation timings of the trigger signals. In an exemplary embodiment, the count value from the counter is read at the timing when the counter finishes counting and enters the off-time. During the off-time and operation of one counter, the counts are read from the other counter and the other counter is ready to start counting for the next switch. By finishing reading the counts of the counter early, the counter can be returned to a countable state at an early stage.

In an exemplary embodiment, the radiation detector 100 is a one-dimensional or two-dimensional detector. In using a 0-dimensional detector, there are no adjacent pixels and no charge sharing occurs. In such a case, there may be an option of increasing the threshold value and decreasing the time constant as a method of suppressing the double count. On the other hand, in the one-dimensional or two-dimensional detector, if the threshold value is increased, the counts with charge sharing cannot be counted and a dead area is formed. In the present disclosure, by providing an off-time at the time of counter switching even in a one-dimensional or two-dimensional detector, it is possible to suppress the double count without generating a dead area.
[Operation of Radiation Detector]

Figure 2:
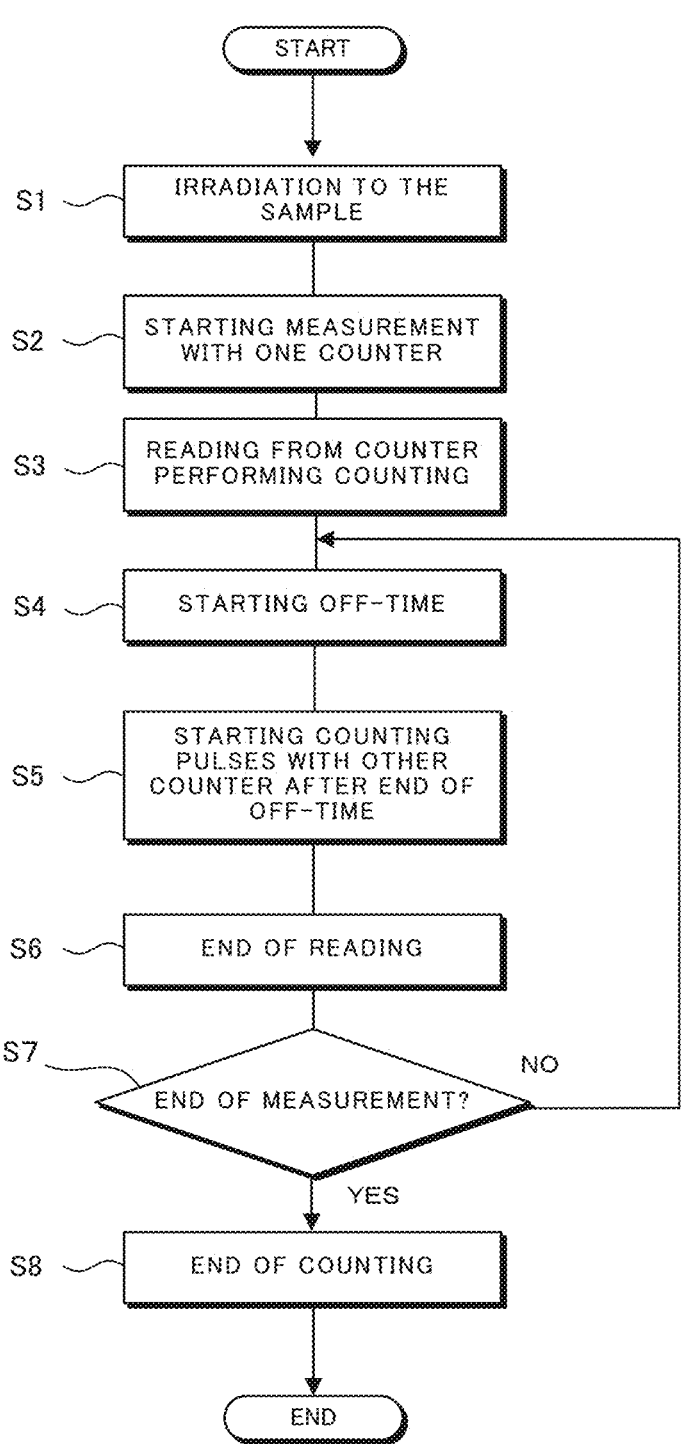
FIG. 2 is a flowchart showing the operation of the radiation detector.

The operation of the radiation detector 100 configured as described above is described. FIG. 2 is a flowchart showing the operation of the radiation detector. First, the sample is irradiated in a zero-dead mode (step S1). When a particle of radiation entering the detection surface is detected by the sensor 110, a pulse is generated. First, the measurement of the radiation is started at one of the counters (step S2). The pulses are counted in one counter.

When an external or internal trigger signal is received, the control circuit 160 causes one of the counters to finish counting the pulses, and the read circuit 170 starts reading the counting data from the counter that finishes counting (step S3). Then, the off-time is started at the same time (step S4). Neither the counter counts during the off-time.

After the end of the off-time, counting of the pulses is started at the other counter (step S5). While the other counter maintains the counting, the readout of the counting data from the one of the counters, which has completed the counting, is completed (step S6).

Thereafter, the radiation measuring apparatus using the radiation detector 100 determines whether or not the measurement has been completed (step S7), and if the measurement has not been completed, the operation returns to step S3, and the radiation measuring apparatus switches the counters on receiving the trigger signal. In this way, the steps S3 to S7 are repeated until the measurement is completed. On the other hand, if it is determined in step 7 that the measurement has been completed, the counting is ended, and the measurement is finished.

By such operations of the radiation detector 100, the double count is suppressed, and the count I1 when exposure for a frame is performed with a single counter matches the count IN when continuous exposure is performed by switching a plurality of counters. Thus, it is possible to significantly suppress an error in continuous exposure in a short exposure time.

A case would be considered in which the radiation is incident at random timing and that the counting loss due to the overlap of pulses is negligible. The count I1 when exposure for a frame is performed with a single counter can be expressed by Formula (1) by using the exposure time T1($s$) and the average incident intensity I0($cps$).

$$I_1 = I_0 \times T_1 \tag{1}$$

Next, a case would be considered in which a counter is switched among the plurality of counters for exposure. When Texp is assumed to be an exposure time for one frame, the count IN obtained by acquiring N frames can be expressed by Formula (2).

$$I_N = I_0 \times T_{exp} \times N \tag{2}$$

If T1 and Texp are set so that the following relational formula holds, I1 should coincide with IN because the total exposure time is both the same.

$$T_1 = N \times T_{exp} \tag{3}$$

However, since a double count occurs at the time of counter switching, IN actually becomes as shown in Formula (4).

$$I_N = I_0 \times (T_{exp} + \tau) \times N \tag{4}$$

$\tau$ is the time constant of the detector. Further, the ratio of I1 to IN is obtained from Formulas (1), (3) and (4).

$$\frac{I_N}{I_1} = \frac{T_{exp} + \tau}{T_{exp}} = 1 + \frac{\tau}{T_{exp}} \tag{5}$$

From this formula, it can be seen that the increment of the intensity by double count is $\tau/Texp$. If Texp is sufficiently longer than t, the double count occurs few and the error is small, but if Texp is set to be short, the probability of double count is increased, so that the error becomes large. In order to solve this problem, when the off-time Toff is set at the time of switching the counter, Formula (4) can be rewritten as follows.

$$I_N = I_0 \times (T_{exp} - T_{off} + \tau) \times N \tag{6}$$

When it is assumed that the off-time is set so that Toff=$\tau$, Formula (6) is expressed by Formula (7).

$$I_N = I_0 \times T_{exp} \times N \tag{7}$$

Formula (8) was derived from Formulas (1), (3) and (7), and it is shown that IN coincides with I1.

$$I_N = I_1 \tag{8}$$

In this way, the double count is suppressed by setting the off-time, and measurement with less error can be expected even in the continuous exposure in the short-time exposure. The number of detected photons relative to the number of incident photons is plotted on a theoretical curve determined based on the radiation source. Thus, the error can be suppressed particularly remarkably in the measurement of short-time exposure when a high-intensity radiation source is used.

Figure 3:
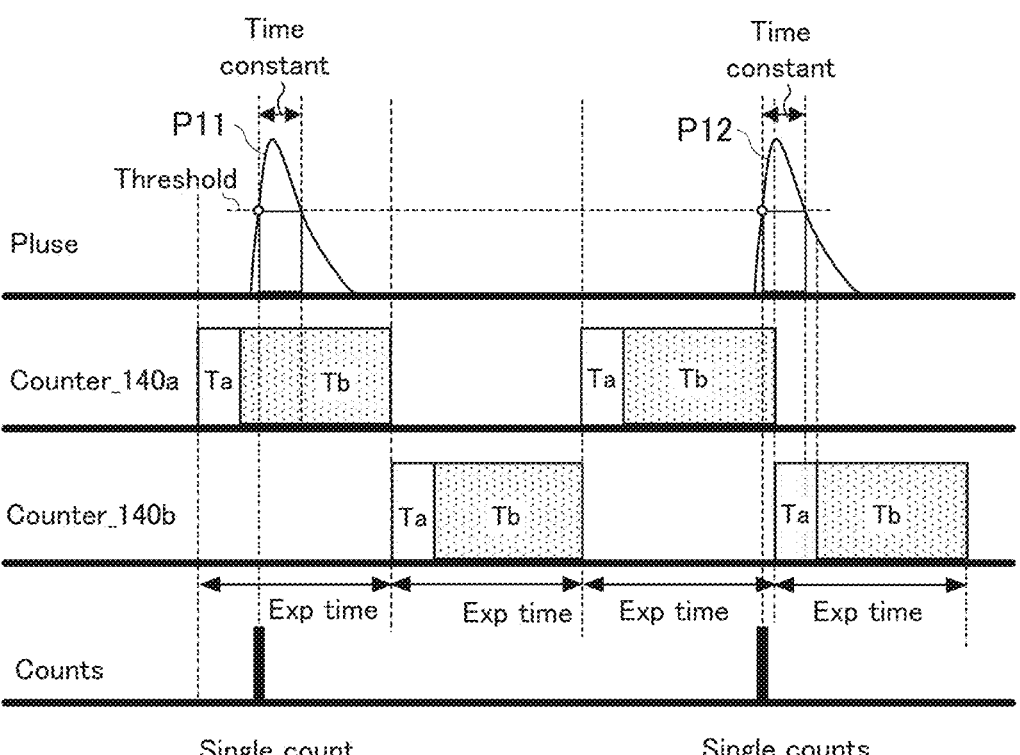
FIG. 3 is a timing chart showing an example of suppressing the double count.

The theoretical curve is represented by a distribution of probabilities for two counts with respect to the probability of counting incident photons per pixel (X-ray intensity). In FIG. 3 of Non-Patent Document 1, the theoretical curve is represented by a solid line as a Poisson-Gamma (PG) distribution. Conventional radiation detectors may have a higher probability of the double count than the value given by the theoretical curve for short-time exposure when using a high-intensity radiation source, but the present disclosure can reduce such events. In particular, when the number of detected photons per pixel is $1 \times 10^{-4}$ or more and $1 \times 10^{-2}$ or less, the double count is prevented, and the number of detected photons relative to the number of incident photons is plotted on a theoretical curve determined based on the radiation source.

For example, when it is assumed that the time constant t of the pulse is 100 ns and the exposure time Texp of one frame is 50 μs, and that the X-rays are incident at random timings, the probability of the double count can be calculated as follows.

$$\frac{\tau}{T_{exp}} = 0.002 \qquad (9)$$

when it is assumed that the mean intensity I of the incident X-rays is 2 Mcps and the number of images N is 10,000, the true count can be calculated as follows.

$$I \times T_{exp} \times N = 1,000,000 \text{ counts} \qquad (10)$$

On the other hand, the estimated count when this method is not applied can be calculated as follows.

$$I \times T_{exp} \times N \times \left(1 + \frac{\tau}{T_{exp}}\right) = 1,002,000 \text{ counts} \qquad (11)$$

Under this condition, the error (+2000 counts) due to the double count is larger than the statistical error (±1000 counts) calculated by the square root of the true count. The present disclosure is effective when the error due to the double count is large.

[Suppressing Double Count]

FIG. 3 is a timing chart showing an example of suppressing the double count. In FIG. 3, the wave height of the pulse entering the counter circuit, the on/off of each counter for counting the pulse and the counting in the counter are shown (the same applies to FIG. 4).

As shown in FIG. 3, in the radiation detector 100, the counter performing the count is switched between the counter 140*a* and the counter 140*b*, so that the exposure times (Exp time) of the respective frames continue without interruption. The time constant of the pulsed signal of the incident photon is about 100 ns, and particularly when the exposure time Exp time per frame is set to 100 μs or less and the measurement is performed, the suppression of the double count is highly effective.

For the counters 140*a* and 140*b*, after one counter completes the counting, the other counter in on standby for an off-time Ta, and after that, the other counter starts the counting time Tb. In the counting time Tb, the counter is turned on and counting is performed. The time calculated by summing up the off-time Ta and the counting time Tb corresponds to the conventional counting time. By providing the off-time Ta, it is prevented that the time corresponding to the pulse-width of the incident photon is also sensitive.

Figure 10:
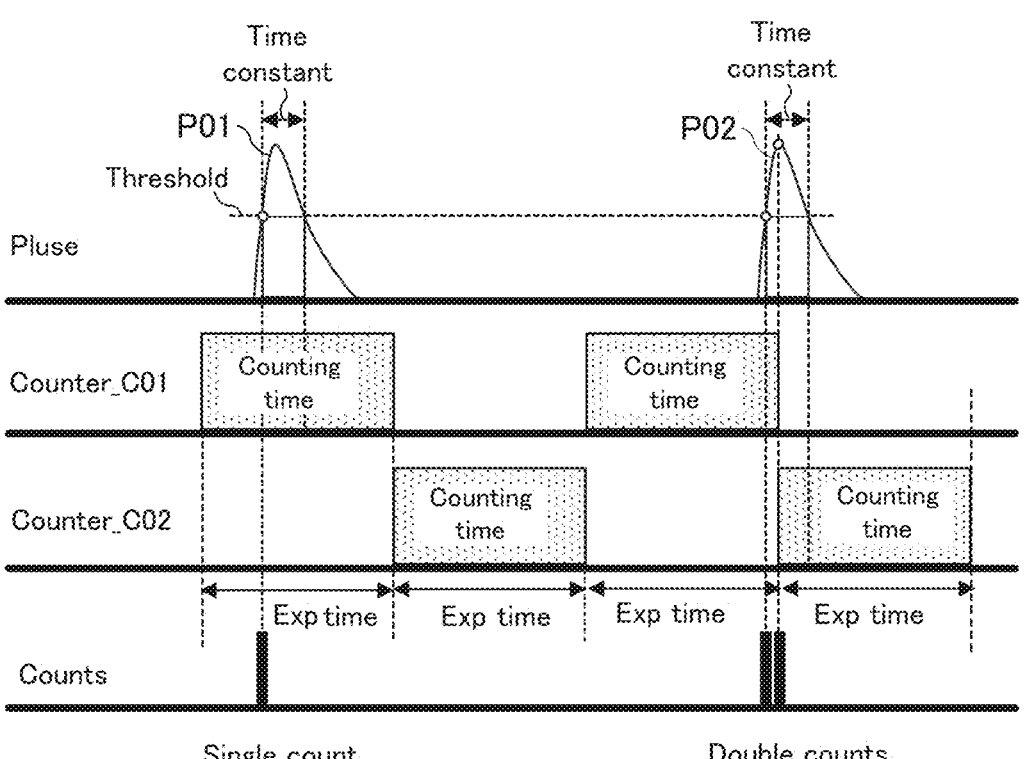
FIG. 10 is a timing chart showing an example of occurrence of a double count.

In the radiation detector 100 performing such an operation, when the pulses P11 and P12 reach the counter as in the case of FIG. 10, the pulse P12 enters the counter 140*a*, which is immediately before being turned off, and is counted only with the counter 140*a*. At the timing when the counter 140*b* is turned on, the pulse P12 is not counted in the counter 140*b* because the pulse P12 is less than or equal to the threshold.

In other words, the pulse P12 is counted with the counter 140*a* because the time when the pulse P12 exceeds the threshold overlaps with the counting time Tb of the counter 140*a*. However, due to the presence of the off-time Ta, the time when the pulse P12 exceeds the threshold does not overlap with the counting time Tb of the counter 140*b*, and the pulse P12 is not counted with the counter 140*b*. Therefore, in this case, a double count does not occur.

[Suppressing Counting Loss]

Figure 4:
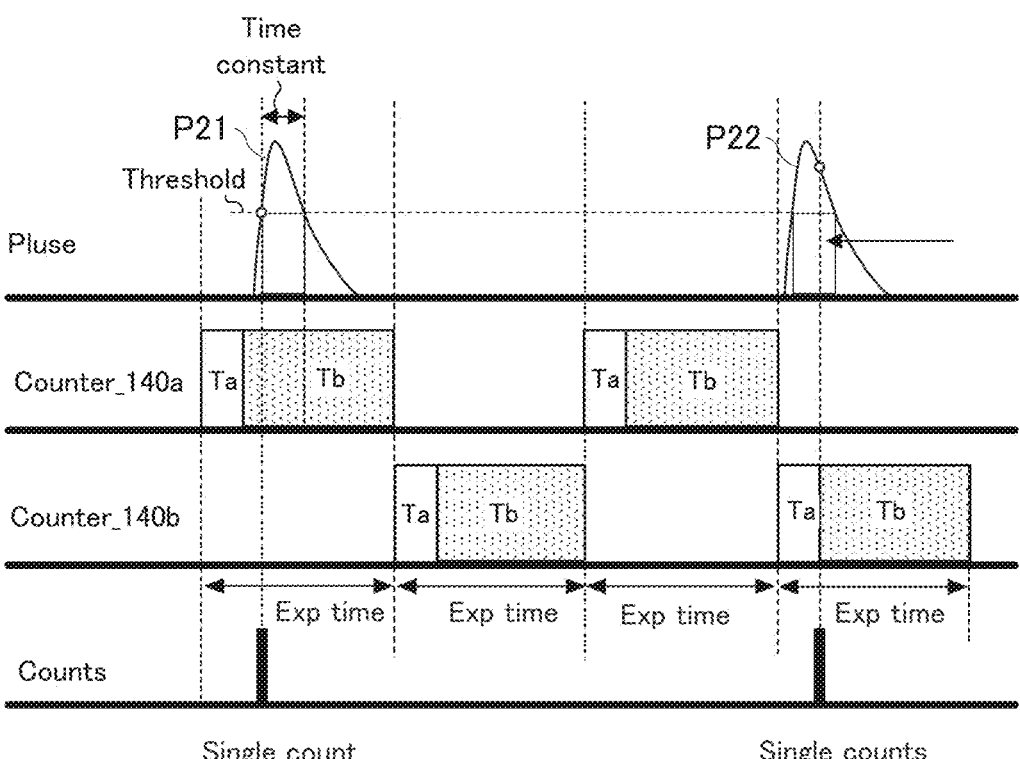
FIG. 4 is a timing chart showing an example of suppressing counting loss.

FIG. 4 is a timing chart showing an example of suppressing the counting loss. As shown in FIG. 4, for the counters 140*a* and 140*b*, after one counter completes the counting, the other counter is on standby for an off-time Ta, and after that, the other counter starts the counting time Tb. The off-time Ta corresponds to the time-constant of the pulse. The time constant of the pulses is, for example, on the order of 100 ns.

In the radiation detector 100 that performs such an operation, when the pulse P22 reaches the counter circuit, the pulse P22 enters the counter circuit after the counter 140*a* is turned off before the counter 140*b* is turned on. In this case, when the counter 140*b* is turned on after a standby time correspondent to a time constant, the pulsed P22 is counted with the counter 140*b* because its wave height is still above the threshold.

In other words, the pulse P22 is not counted with the counter 140*a* because the time when the pulse P22 exceeds the threshold does not overlap with the counting time Tb of the counter 140*a*. However, since the off-time Ta is set with the time constant of the pulse, the time when the pulse P22 exceeds the threshold overlaps with the counting time Tb of the counter 140*b*, and the counter 140*b* counts the pulse P22. In this case, therefore, counting loss does not occur. In this way, even though there is a gap in the counting time, by setting the gap equal to the time constant of the pulse, the measurement without counting loss is realized.

Application Example

The radiation detector 100 is particularly suitable for measuring XPCS, single crystal X-ray diffraction of ultra-fine slices, or the like that requires a short exposure time. If no high-speed measurement is performed, the error due to the double count is also buried in the statistical error. However, when a high-speed measurement in the zero dead mode is possible, the error is not negligible. In particular, when the exposure time is shortened in the zero dead mode, the error due to the double count becomes and noticeable, therefore, suppression of the double count becomes important.

Figure 5:
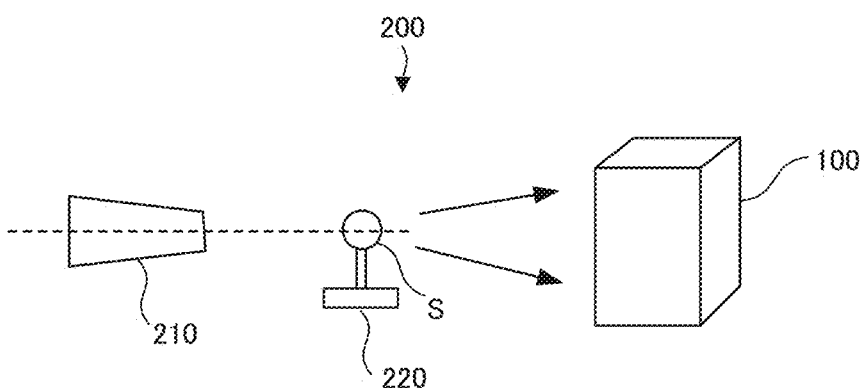
FIG. 5 is a schematic diagram showing a configuration of a radiation measuring apparatus.

The radiation detector 100 is mounted on a radiation measuring apparatus and thereby can be used for radiation measurement in continuous exposure. FIG. 5 is a schematic diagram showing a configuration of the radiation measuring apparatus 200. The radiation measuring apparatus 200 includes a radiation source 210, a sample holder 220, and a radiation detector 100.

The radiation source 210 continuously emits radiation. The sample holder 220 holds the sample S. The radiation detector 100 enables measurement with suppressing the double count and counting loss occurred by switching the counter. Thus, highly accurate data can be obtained by single crystal X-ray diffraction, XPCS or the like.

Figure 6:
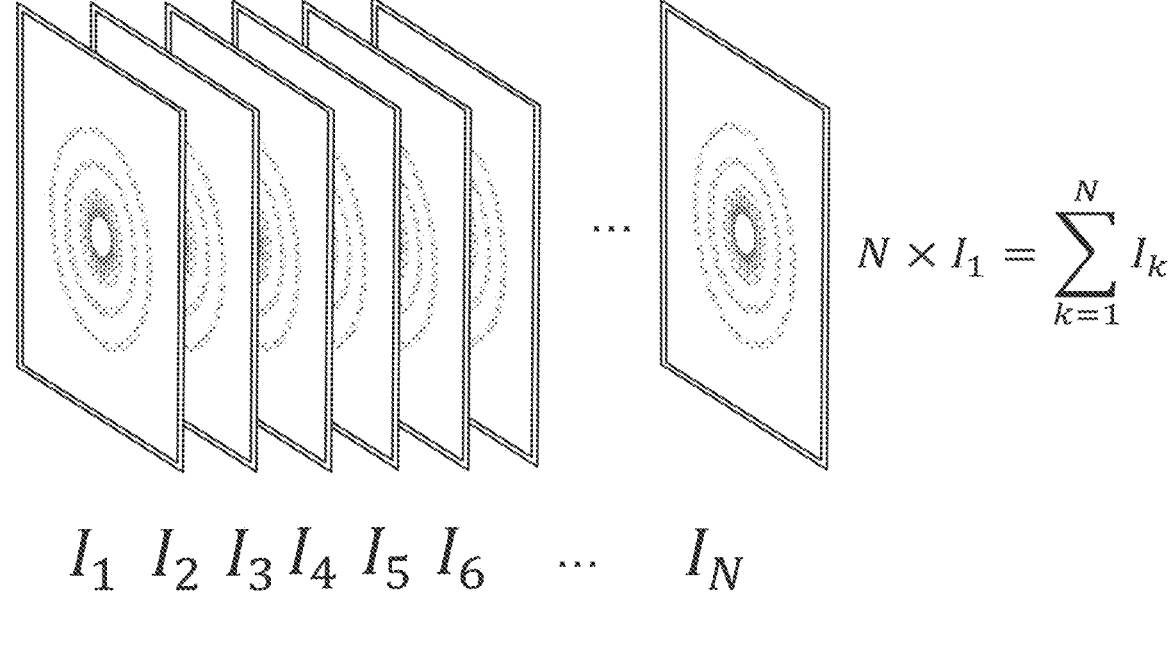
FIG. 6 is a schematic diagram showing the multi-frame imaging.

FIG. 6 is a schematic diagram showing the multi-frame imaging. In the single crystal X-ray diffraction, many images are acquired while moving the goniometer, and the analysis is carried out by adding them together. Although a double count does not occur when analyzing an image of only one frame, an error occurs due to the effect of the double count by switching the counter in the conventional method when the intensity is calculated by adding them together. In the single crystal X-ray diffraction, the intensity has an extremely large meaning, and the accuracy of the structure analysis deteriorates as the error increases. In the present disclosure, since the piled-up radiation intensity is equal to N times the intensity of one frame, it is possible to measure with a free setting without being bothered by the error corresponding to the exposure time or the number of piled-up frames.

In the XPCS (X-ray Photon Correlation Spectroscopy) measurement, coherent X-rays are incident on the moving particles, and the variation (fluctuation) of the scattering intensity with time is measured. In order to observe the motion of the fast particles, the exposure time needs to be shorter than the time of the fluctuation of the particles, so that the scattering intensity of each frame is inevitably small. In addition, the scattering intensity is further reduced due to the convenience of using coherent X-rays. Therefore, the scatter intensity per frame is very small in XPCS measurement.

Therefore, in XPCS measurement, it is required that the error is small even under the condition of low intensity in the short-time exposure. When a double count occurs and the scattering intensity of a single frame increases, the contrast between the previous and subsequent images increases (or decreases). Accordingly, the errors become noticeable in the short time domain, and it becomes impossible to accurately measure the fast motion of the particles. In such a case, the present disclosure for suppressing errors due to the double count and counting loss is particularly effective.

(Single Crystal X-Ray Diffraction Apparatus)

Figure 7:
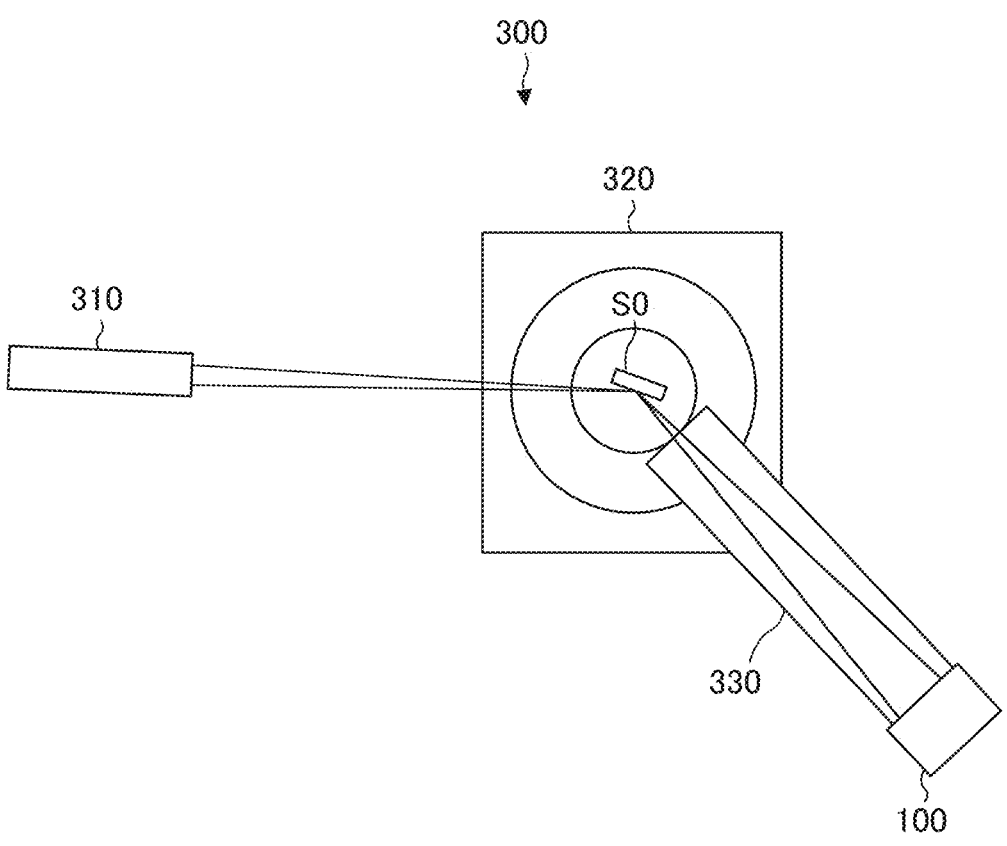
FIG. 7 is a plan view showing an example of a radiation measuring apparatus.

As a specific example, an example in which the radiation detector 100 is incorporated in an X-ray analysis apparatus is described. FIG. 7 is a plan view showing an X-ray analysis apparatus 300 as an example of a radiation measuring apparatus. The X-ray analysis apparatus 300 is a single crystal X-ray diffraction apparatus for acquiring diffraction X-ray images, and comprises an X-ray source 310, a sample stage 320, an arm 330, a control unit and a radiation detector 100. The X-ray source 310 continuously irradiates the sample S0 with X-rays.

The radiation detector 100 can control the quantity to be measured by the signal from the goniometer while remaining in the exposure state, and output measurement data for each synchronization of the goniometer signal. Throughput in the measurement time can be improved by the continuous exposure, and the errors due to the double count and counting loss can be suppressed.

The sample stage 320 and the arm 330 are interlocked with each other and can rotate around the sample S0 at constant velocities under the control of the control unit. The radiation detector 100 is provided at an end portion of the arm 330 and is controlled to move around the sample S0 together with the arm 330.

By having the radiation detector 100 as described above, the X-ray analysis apparatus 300 can switch the counter using, for example, a control signal for arm movement from the control unit as a trigger signal and can count X-rays in the continuous exposure without dead time.

(Manufacturing Line)

Figure 8:
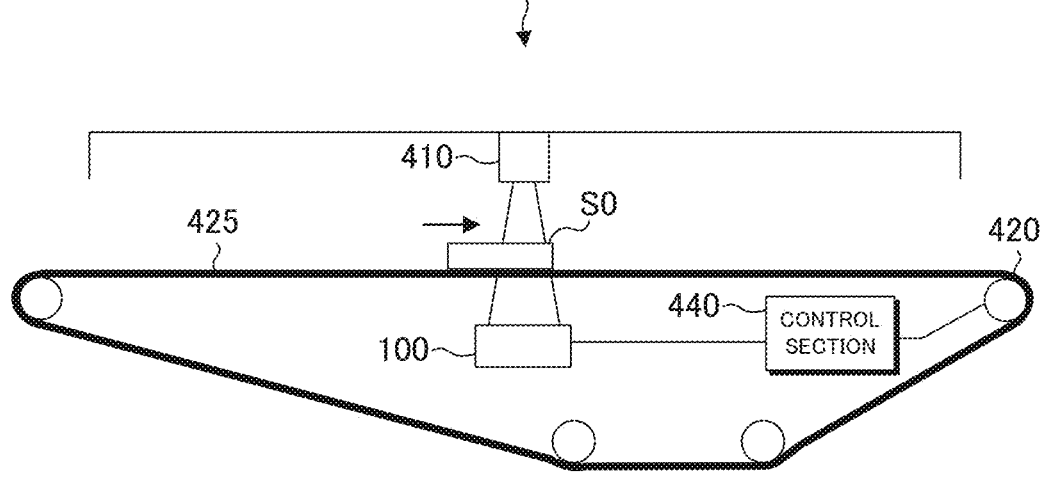
FIG. 8 is a side view showing an example of a radiation measuring apparatus.

FIG. 8 is a side view showing the X-ray analysis apparatus 400 as an example of the radiation measuring apparatus. The X-ray analysis apparatus 400 is manufacturing line capable of X-ray inspection, and comprises an X-ray source 410, a roller 420, a belt 425, a controller 440 and a radiation detector 100. The X-ray source 410 continuously irradiates the product S1 with X-rays.

The belt 425 is moved by the rotation of the roller 420 and moves the product S1 in the direction indicated by the arrow in the drawing. The belt 425 is moved at a constant speed under the control of the control unit 440. The radiation detector 100 is provided on the other side of the X-ray source 410 across the belt 425 and the product S1, and the product S1 is controlled to move together with the belt 425.

By having the radiation detector 100 as described above, the X-ray analysis apparatus 400 can switch the counter using, for example, a belt control signal from the control unit 440 as a trigger signal and can count X-rays in the continuous exposure without dead time. In this case, it is possible to suppress the errors due to the double count and counting loss.

[Setting Radiation Detector]

In order for the radiation detector 100 to function, it is necessary not only to provide a counter switching mechanism but also to set an off-time. Setting of the off-time requires setting by an operator with expertise.

Figure 9:
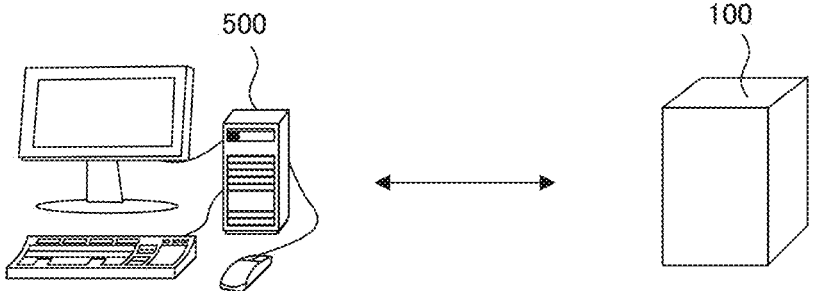
FIG. 9 is a schematic diagram showing a configuration of the radiation detector at the time of setting.

FIG. 9 is a schematic diagram showing a configuration of the radiation detector 100 at the time of setting. When the radiation detector 100 is used by the user without setting the off-time, the operator on the provider side sets the off-time. To set the off-time, the computer 500 needs to be connected to the radiation detector 100. The operator operates the computer 500 to make settings in the circuit of the radiation detector 100.

First, the computer 500 displays a setting screen of the radiation detector 100 and receives an input for setting an off-time from the operator. Then, the computer 500 causes the radiation detector to hold the input setting. Thus, it is possible to perform an update in which the off-time is set in the radiation detector capable of continuous exposure by switching the counter, and to acquire highly accurate data by suppressing the double count.

EXAMPLE

Figure 11A:
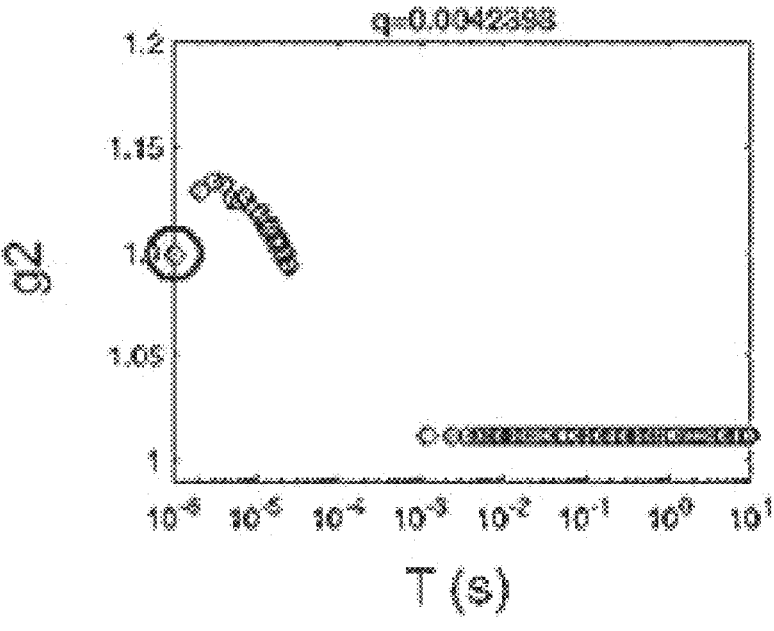
FIGS. 11A and 11B both are graphs showing the measurement results of XPCS for the comparative examples (Burst mode and Zero dead mode are used respectively).
Figure 11B:
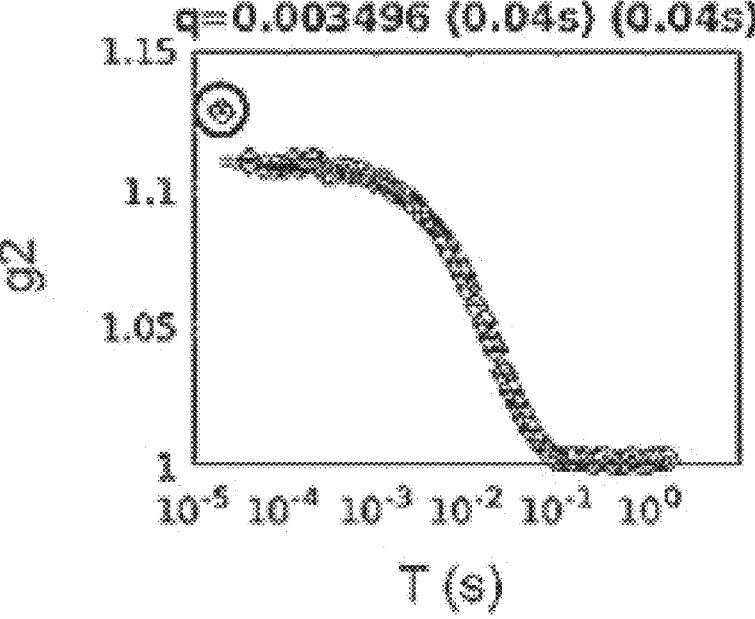
Figure 12A:
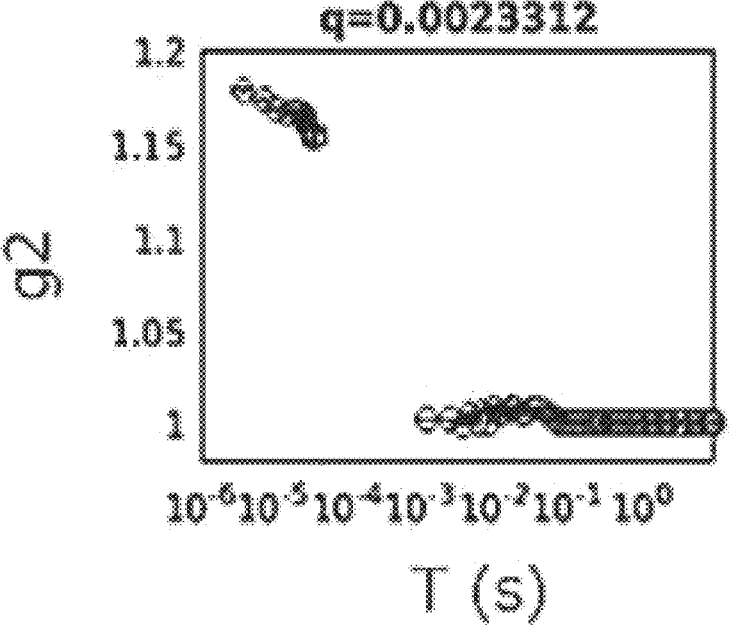
FIGS. 12A and 12B both are graphs showing the measurement results of XPCS for the practical examples (Burst mode and Zero dead mode are used respectively).
Figure 12B:
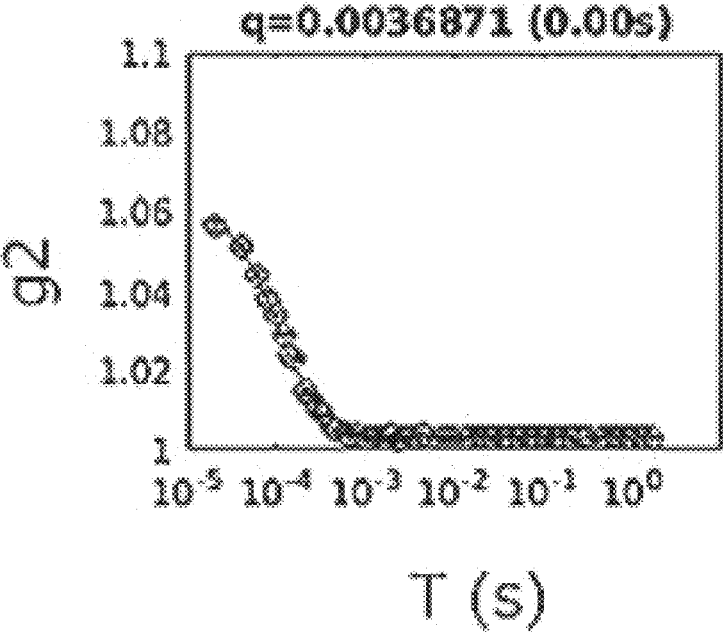

The XPCS measurement was performed on a specific sample using each of a conventional radiation detector and the radiation detector 100 of the present disclosure. The measurement results were obtained as comparative examples and practical examples, respectively. FIGS. 11A and 11B both are graphs showing the measurement results of XPCS for the comparative examples (Burst mode and Zero dead mode were used respectively). FIGS. 12A and 12B both are graphs showing the measurement results of XPCS for the practical examples (Burst mode and Zero dead mode were used respectively).

The horizontal axis represents time, and the vertical axis represents a correlation function calculated from the variation of the X-ray intensity with time. FIGS. 11A and 11B show that the leftmost point (the circled point) is largely off. This outlier phenomenon occurs for the leftmost point (minimum time) when a pulse due to one incident photon is counted across two adjacent frames with a double count.

In XPCS measurement, it is crucial to accurately measure the variation of the X-ray intensity with time. When a double count occurs at the time of counter switching, a pulse is always counted across two adjacent frames. Thereby, the point at the smallest time (~Exp time) calculated from the intensity variation between the neighboring frames is largely out of the true value.

On the other hand, when the present disclosure is applied, since the double count does not occur even if the X-ray is incident at the time of counter switching, it is possible to accurately recognize the variation of the X-ray intensity with time. Therefore, as shown in FIGS. 12A and 12B, it is possible to obtain an accurate correlation function without outliers even at the point of the smallest time. That is, the plots of the correlation functions are continuous. Thus, the present disclosure can be demonstrated to be very effective when it is desired to accurately measure the variation of the X-ray intensity with time in an extremely short time.

What is claimed is:

1. A radiation detector detecting radiation in continuous exposure, comprising:

a plurality of pixels arranged in a one-dimensional or two-dimensional array, each of the pixels including a sensor for generating a pulse in response to a particle of radiation being detected and a plurality of counters provided for counting the pulses, a setting holding circuit for holding a setting of an off-time for turning off all of the plurality of counters in all the pixels, and a control circuit for switching the counter performing counting the pulses after a lapse of the off-time for all of the plurality of counters in all the pixels with respect to a trigger signal.

2. The radiation detector according to claim 1, wherein the off-time is a time constant.

3. The radiation detector according to claim 1, wherein the number of detected photons relative to the number of incident photons is plotted on a theoretical curve determined based on the radiation source.

4. The radiation detector according to claim 1, wherein the radiation detector is a one-dimensional or two-dimensional detector.

5. A radiation measuring apparatus capable of measuring radiation in continuous exposure, comprising:

a radiation source for continuously irradiating radiation, a sample holder for holding a sample, and the radiation detector according to claim 1.

6. The radiation measuring apparatus of claim 5, wherein the off-time is a time constant.

7. A method of setting a radiation detector for detecting radiation in continuous exposure, the radiation detector comprising a plurality of pixels arranged in a one-dimensional or two-dimensional array, each of the pixels comprising a sensor for generating a pulse in response to a particle of radiation being detected and a plurality of counters provided for counting the pulses, comprising steps of:

receiving an input for setting an off-time for turning off all of the counters in all the pixels comprised in the radiation detector, and causing the radiation detector to hold the input setting.

*   *   *   *   *